United States Patent [19]
DeCap

[11] Patent Number: 5,131,722
[45] Date of Patent: Jul. 21, 1992

[54] BOTTOM DUMP TRAILER HAVING AN ADJUSTABLE DISCHARGE OPENING

[76] Inventor: Camille DeCap, Box 535, LaFleche, Saskatchewan, Canada S0H 2K0

[21] Appl. No.: 722,301

[22] Filed: Jun. 27, 1991

[51] Int. Cl.⁵ .......................... B65D 47/00; B60P 1/56
[52] U.S. Cl. .................................. 298/35 M; 222/502
[58] Field of Search ...................... 298/24, 25, 27, 29, 298/30-35 M; 105/240, 247, 250, 253, 280, 283, 286, 290, 311.1; 414/162-164, 414, 411, 525.54, 417, 525.55; 222/502, 503, 558

[56] References Cited
U.S. PATENT DOCUMENTS

| | | | |
|---|---|---|---|
| 554,474 | 2/1896 | Bradley | 222/502 |
| 1,417,709 | 5/1922 | Yelm | 298/30 |
| 2,494,472 | 1/1950 | DeSaussure | 298/35 M |
| 2,836,332 | 5/1958 | Standish et al. | 222/502 |
| 2,836,461 | 5/1958 | Shadwick et al. | 298/35 M |
| 3,135,427 | 6/1964 | Siegburg | 222/502 |
| 3,145,057 | 8/1964 | Taggart | 298/35 M |
| 3,246,811 | 4/1966 | Harms | 222/502 |
| 3,254,810 | 6/1966 | Sterrett | 222/502 |
| 3,786,764 | 1/1974 | Beers et al. | 105/250 X |
| 3,797,878 | 3/1974 | Fagre et al. | 414/414 X |
| 3,815,514 | 6/1974 | Heap | 105/290 X |

*Primary Examiner*—Robert J. Spar
*Assistant Examiner*—Brian K. Dinicola
*Attorney, Agent, or Firm*—Adrian D. Battison; Stanley G. Ade; Murray E. Thrift

[57] ABSTRACT

A conventional bottom dump truck includes doors which in a closed position are suspended underneath the bottom opening of the hopper of the trailer. The doors are opened outwardly and upwardly by pivotal action about an upper suspension point of each of the doors. The amount of movement of the door is limited by an abutment member mounted upon a vertical flange on the outside surface of the hopper bottom. The abutment member includes an abutment plate extending outwardly from the flange together with a bracket which has a slot slidable along the length of the flange and locatable at different points along the length of the flange by a pin passing through openings in the bracket and one of a plurality of openings in the flange.

8 Claims, 3 Drawing Sheets

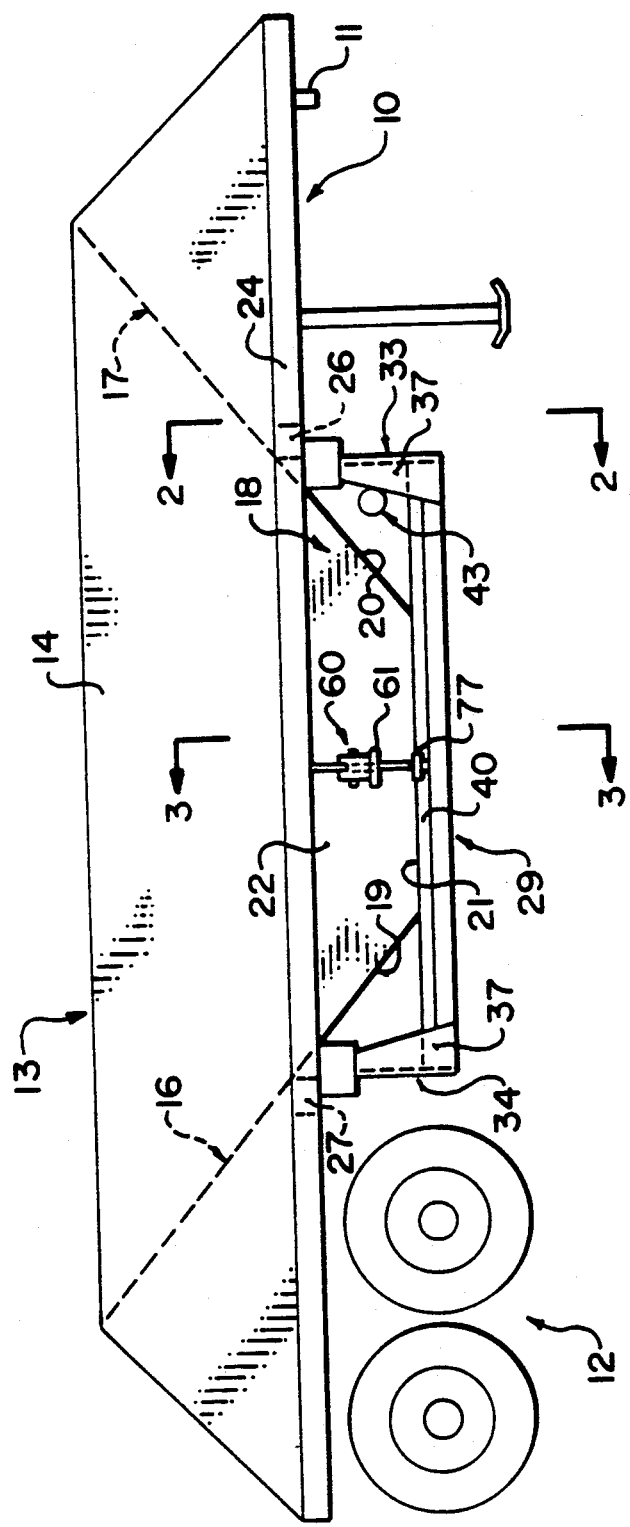

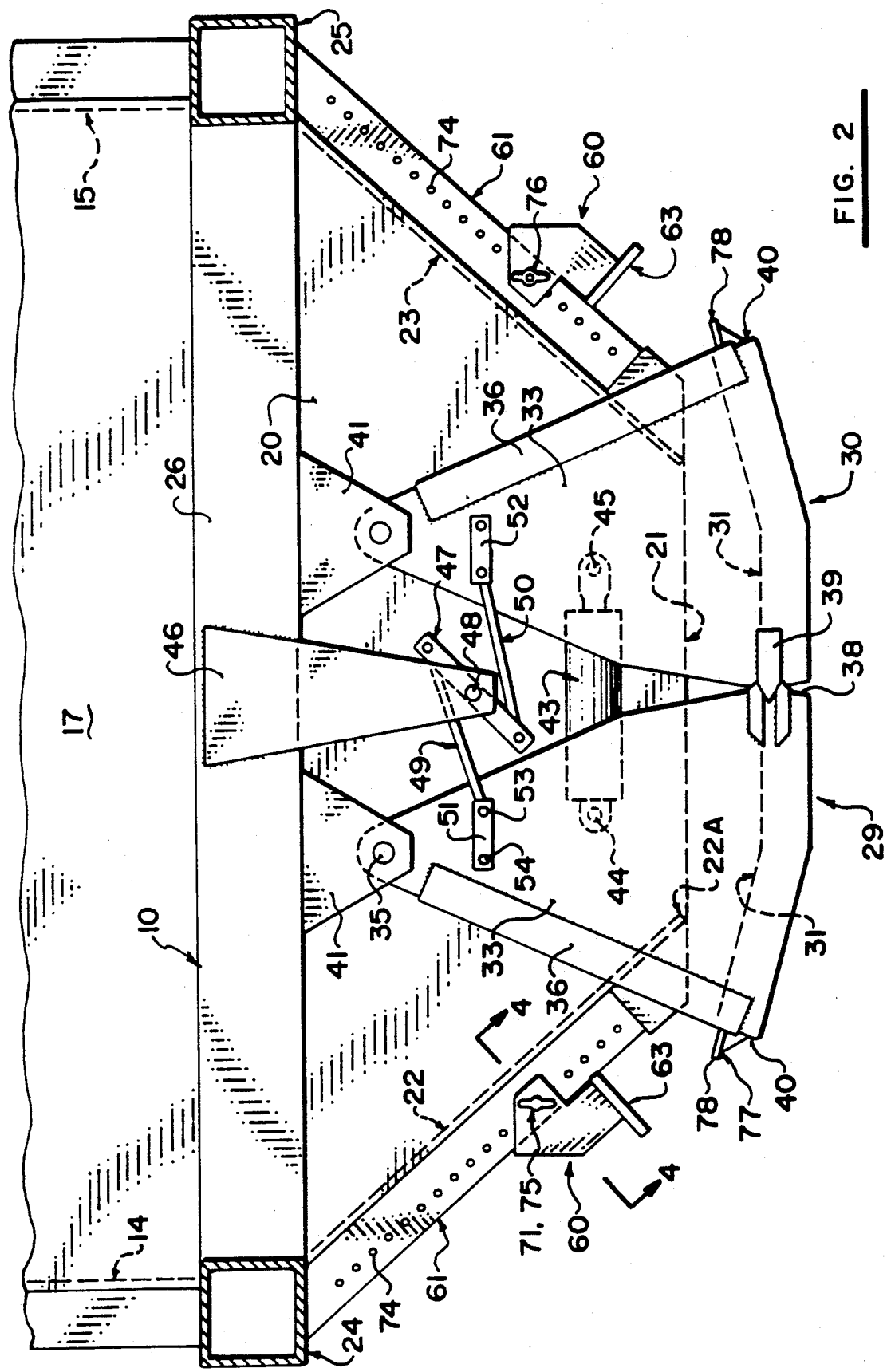

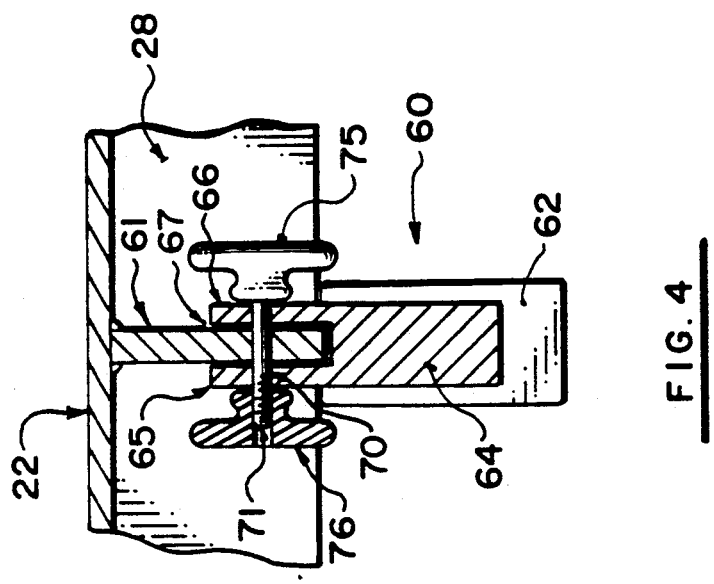
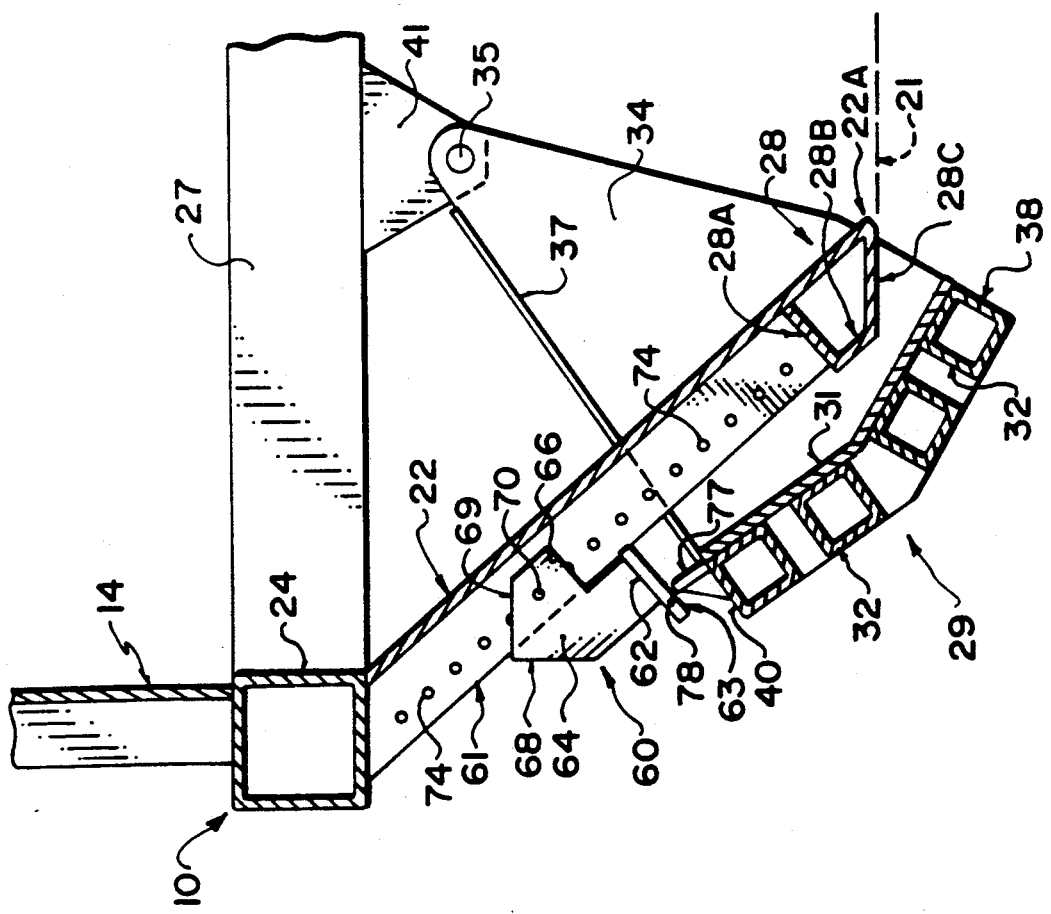

BOTTOM DUMP TRAILER HAVING AN ADJUSTABLE DISCHARGE OPENING

BACKGROUND OF THE INVENTION

This invention relates to a bottom dump trailer and particularly to an arrangement for controlling the amount of movement of the doors of a bottom dump trailer for adjustment of the opening between the doors.

Bottom dump trailers are well known and widely used for transportation of gravel and other pourable solids. The trailer generally comprises a frame having ground wheels on the frame for transportation of the frame across the ground. A hopper is mounted on the frame with converging side walls which extend inwardly and downwardly to an open bottom of the hopper through which the pourable material can be dumped. Across the bottom on the outside is provided a pair of clam-shell type doors which pivot about respective axis which are parallel and arranged above the opening so that in a closed position the doors abutt at a central line of contact below the open bottom. A hydraulic cylinder is generally provided together with a control linkage which operates to move the doors simultaneously outwardly from the closed position so that the doors pivot outwardly and upwardly around the bottom edge of the hopper to define an opening between the doors through which the material can be dumped.

It is necessary in a device of this type to be able to adjust the size of the opening. Generally the hydraulic cylinder and linkage is arranged so that it simply moves the doors from the closed position to a wide open position at which the doors are halted either by the end of the stroke of the hydraulic system or by an engagement of the door with some part of the frame. It is however necessary in many cases to control this opening to a reduced width so that the dumping of the material takes place in a controlled manner to form a windrow as the trailer is moved forward.

Generally this limitation of the movement is provided simply by a chain which is draped between the two doors and is adjusted in length so that it becomes taut at a required opening. The doors are provided with suitable hooks for receiving the chain and the operator simply adjusts the chain by selecting a particular location on the chain to attach a link of the chain to a hook.

This adjustment system is effectively universally employed on all devices of this type and is generally accepted in the trade. However it is seriously disadvantageous in that it is difficult for the operator to make the adjustment since he must handle the relatively heavy chain while crawling or lying under the doors and since the amount of adjustment is not readily measurable since all the links look effectively identical and the skill of the operator must be used in selecting the required link for attachment to a suitable hook to render the chain taut at the required opening. This may therefore involve some trial and error and is of course highly inconvenient.

SUMMARY OF THE INVENTION

It is one object of the present invention, therefore to provide an improved trailer of the bottom dump type in which the opening between the doors can be adjusted more readily and more effectively.

According to the invention, therefore, there is provided a bottom dump trailer comprising a trailer frame, ground wheels for transportation of the frame across the ground, a hopper mounted on the frame for transportation of a pourable solid material including hopper sidewalls converging downwardly and inwardly to an open bottom of the hopper for discharge of the material through the open bottom, a pair of doors for opening and closing the open bottom each including a door surface and means mounting the door surface suspended from the frame so as to be pivotal about a respective axis of movement offset from the door surface to one side thereof, said respective axis being parallel and arranged above said open bottom, the doors thus being pivotally movable each about said respective axis from a first position, in which the door surfaces lie across an underside of the open bottom with a front edge of each door surface in contact with a front edge of the other door surface at a line of contact which is generally midway across and below the open bottom so that the door surfaces are arranged symetrically relative to a symetrical line of contact between the door surfaces, to a second position in which an opening is formed between said front edges, drive means for simultaneously moving both doors outwardly from the first position such that each moves outwardly from said symmetrical line toward a respective one of two opposed sides of the hopper, and means for halting said simultaneous movement at a required predetermined size of the opening between said front edges, said halting means comprising a first and second abutment member, first mounting means mounting said first abutment member on a first frame member adjacent a respective one of said opposed sides of the hopper, second mounting means mounting said second abutment member on a second frame member adjacent the other of said opposed sides of the hopper, each of said doors having means thereon for engaging a respective one of said first and second abutment members, each of said mounting means including means defining a plurality of selectable locations for the respective abutment member such that the amount of movement of the respective door from the first position can be adjusted for adjustment of the size of the opening.

The abutment members are therefore located at a position on the side of the hopper which is readily accessible to the operator. In most cases the operator can simply walk to the side of the hopper and adjust the position of the abutment member. In the preferred embodiment described hereinafter, the abutment member can simply slide along a flange and can be located at the required position by passing a pin through the abutment member and through the flange. There is no necessity for the operator to crawl under the device or to guess the location and length of a chain.

BRIEF DESCRIPTION OF THE DRAWINGS

FIG. 1 is a side elevational view of a trailer according to the present invention.

FIG. 2 is a view along the lines 2—2 of FIG. 1.

FIG. 3 is a view along the lines 3—3 of FIG. 1 showing one half only of the bottom of the hopper for convenience of illustration.

FIG. 4 is a cross-sectional view along the lines 4—4 of FIG. 2.

One or more embodiments of the invention will now be described in conjunction with the accompanying drawings.

BRIEF DESCRIPTION OF THE DRAWINGS

A trailer is shown in FIG. 1 and comprises a main frame schematically indicated at 10 having a kingpin 11 at a forward end for attachment to a tractor vehicle and ground wheels 12 at a rearward end for transportation of the trailer across the ground. The main frame 10 carries a hopper generally indicated at 13 with side walls 14 and 15 and end walls 16 and 17. The end walls converge inwardly toward a central section to allow discharge of a pourable solid material to be transported within the hopper.

A hopper bottom section is generally indicated at 18 and includes end walls 19 and 20 acting as continuations of the end wall 16 and 17 so that they converge inwardly toward an open bottom 21 through which the material is to be discharged. The hopper bottom further includes side walls 22 and 23 which also converge inwardly toward the rectangular bottom opening 21 which lies in a horizontal plane and is bounded by the lowermost edges of each of the converging hopper bottom walls 19, 20, 22 and 23.

The main frame 10 includes a pair of longitudinal main beams 24 and 25 which extend along the full length of the trailer together with a plurality of cross beams one of which is shown at 26 and is positioned just forward of the hopper bottom and a similar cross beam 27 is positioned just rearward of the hopper bottom. Further frame beams can also be provided to give the necessary structural strength but are not shown for convenience of illustration.

As best shown in FIG. 3, the main longitudinal beam 24 projects outwardly from the side wall 14 of the hopper and also projects outwardly from the hopper bottom side wall 22. In addition, to provide structural strength for the lowermost edge of the hopper bottom walls, a beam 28 is provided at that lowermost edge and is defined by a fabricated channel which is attached to the outer surface of the side wall at the lowermost edge indicated at 22A. The channel includes a flange 28A projecting outwardly from the side wall, a web 28B parallel to the side wall 22 and a lower most horizontal flange 28C extending from the lowermost edge of the web 28B to an apex at the lowermost edge 22A of the side wall 22.

In order to maintain the pourable solid material within the hopper when under transportation, a pair of doors is provided as indicated at 29 and 30 which cooperate generally in a clam shell manner. Each of the doors comprises a door surface 31 onto which the material will fall to be supported by the door surface against further vertically downward movement. As shown in FIG. 3 the door surface is formed from a metal sheet which is supported by longitudinal beams 32. The longitudinal beams are attached to triangular end plates 33 and 34 which extend upwardly from the door surface to a pivot axle 35 positioned on the upper side of the door surface and generally symmetrically above the door surface to allow a pivotal action of the door surface about an axis offset from the door surface and arranged above the door surface as best shown in FIG. 2. The triangular end plates 33 and 34 are supported by stiffening ribs 36 and by side plates 37 to cradle the ends of the beams 32 and to provide a sufficiently rigid and strong frame to support the door surface 31 and the weight of the material carried thereby during the transportation mode.

As shown in FIG. 2, the doors each include a front edge 38 which in the closed position abut at a line of contact substantially symetrically positioned centrally of the hopper bottom and longitudinally of the hopper bottom. A suitable strengthening guide element 39 is provided at the line of contact to assist in preventing twisting of one door relative to the other in the closed position of the door against the relatively large forces provided by the material on the door surface. Each of the doors further includes an outermost edge 40 which of course is positioned outwardly of the edge 22A in the closed position shown in FIG. 2 so as to prevent the escape of material outwardly over the outer edge of the door. The position of the door relative to the edge 22A is arranged such that the repose angle of the material acts to keep the material restrained within the hopper bottom and above the door surfaces.

The axle 35 of each door is mounted upon a triangular support 41 carried on the main transverse beam 26 and 27 and depending therefrom. The axle is thus located above the opening 21 with each axle spaced equidistantly outwardly from the central line of contact but inwardly of the edge 22A.

Movement of the doors from the closed position shown in FIG. 2 is obtained by operation of a hydraulic cylinder 43 located in the space between the front wall 20 of the hopper bottom and the end plate 33 of the doors. The hydraulic cylinder 43 includes end couplings 44 and 45 connected respectively to the doors 29 and 30 so that expansion of the hydraulic cylinder causes the doors to move apart to an open position.

A control linkage is provided to ensure symetrical movement of the doors as the doors are opened so that each door moves from a closed position towards an open position by an equal amount. The control linkage is supported from a bracket 46 positioned on a centre line of the trailer and depending downwardly between the two supports 41. The bracket carries a first lever 47 which is pivotal about an axle 48 carried at a lower end of the bracket 46. The lever extends outwardly from each side of the axle 48 to define an upper and a lower part with the upper part connected to the door 29 by a rod 49 and a lower part connected to the door 30 by a rod 50. Each of the rods connects to a link 51 and 52 respectively. The link 51 is pivotally coupled to the rod 49 at a pivot axis 53 and is pivotally connected to the door 29 at a pivot axis 54. The amount of movement of the link is limited. As the doors are thus moved apart, the cooperation between the control rods 49 and 50 and the central lever 47 ensures that the doors move symmetrically.

The amount of movement of each of the doors is controlled by an abutment member generally indicated at 60. Each of the doors 29 and 30 has a respective one of a pair of the abutments members 60. The abutment member 60 can be adjusted in position inwardly and outwardly to limit the amount of movement of the doors to a required position so as to adjust, to a required dimension, the opening between the doors through which the material is deposited.

Each of the abutment members 60 is mounted upon a flange 61 which lies in a vertical plane and extends as best shown in FIG. 3 from the main beam 24 or 25 to the lower support beam generally indicated at 28. The flange thus is welded to the side wall 22 at spaced positions along the length of the flange and acts therefore as a support flange for the wall 22. The flange is welded at its upper end to the beam 24 or 25 and its lower end to the flange 28A of the lower beam 28. The flange 61 projects out to a distance approximately equal to the width of the flange 28A.

The abutment member 60 includes an abutment plate 62 which is supported so that it extends outwardly from the flange 61 generally at right angles thereto and defines a lower surface 63 providing an abutment surface for engaging the outer edge of the door in the open position. The abutment plate 62 is supported in position by a support bracket 64 mounted upon the flange 61. The bracket 64 includes a pair of projecting portions 65 and 66 which extend toward the flange 61 and define a slot 67 therebetween for receiving the flange 61 in a sliding action between the projecting portions. The projecting portions extend partway across the width of the flange and over a length sufficient to hold the bracket in place on the flange without twisting. From a projecting portion 65 and 66, the bracket extends outwardly from the flange and slightly longitudinally of the flange from the projecting portions to be connected to the abutment plate 62 at a position spaced downwardly from the projecting portions. The edges 68 and 69 of the bracket are chamfered to provide a pleasing appearance of the element defining the bracket. The bracket has an opening 70 therethrough passing through the projecting portion 65 and 66 to receive a pin 71 in a locking action of the bracket 64 on the flange 61. The flange 61 thus includes a plurality of such openings 74 at spaced positions along the length of the flange and at a position spaced from the edge of the flange sufficient that the base of the slot in the bracket lies along the outermost edge of the flange when the pin 71 is located through the openings. The pin includes a T-bar handle 75 at one end and a nut 76 at the other end which can be threadidly engaged with a screw thread on the pin to clamp the nut and T-shaped handle against sides of the projecting portions to hold the bracket securely in place on the flange at the required location.

The outer edge 40 of the door carries a projecting plate 77 which has an outer abutment surface 78 for engaging against the surface 63 of the abutment plate 62 in the abuting action shown in FIG. 3. The edge of the plate 78 provides the abuting action against the surface 63 so that the width of the edge 78 is significantly less than the width of the plate 63. This provides a constant and effective abuting action despite the fact that the position of abutment moves longitudinally of the plate 62 as the bracket is moved longitudinally of the flange 61.

In operation, the operator of the vehicle can readily adjust the amount of movement of the door on each side of the vehicle from the closed position to a required open position. The required spacing between the doors in the open position will vary depending upon the particular usage of the vehicle and the material being transported. The adjustment in the device described can be effected with the doors in the closed position simply by the operator removing the pin 71 from the opening in the bracket and sliding the bracket upwardly or downwardly along the flange 61 to the required location. The pin is then replaced in the opening 70 to hold the bracket in position. A single pin is sufficient in view of the effective holding action of the bracket on the flange provided by the slot and the engagement of the base of the slot with the outer edge of the flange. The adjustment can be effected simply by the operator standing adjacent the side of the vehicle without the necessity to crawl under the vehicle or to reach to parts of the vehicle which may have become dirtied by engagement with the material. The operation is therefore clean and efficient.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A bottom dump trailer comprising a trailer frame, ground wheels for transportation of the frame across the ground, a hopper mounted on the frame for transportation of a pourable solid material including hopper sidewalls converging downwardly and inwardly to an open bottom of the hopper for discharge of the material through the open bottom, a pair of doors for opening and closing the open bottom each including a door surface and mounting means mounting the door surface, said mounting means being suspended from the frame so as to be pivotal about a respective axis of movement offset from the door surface to one side thereof, said respective axes being parallel and arranged above said open bottom, the doors thus each being pivotally movable in a direction of movement transverse to the opening about a respective axis between a first portion, in which the door surfaces lie across an underside of the open bottom and front edges of said door surfaces are in contact with each other along a line of contact which is generally midway across and below the open bottom so that the door surfaces are arranged symetrically relative to said line of contact between the door surfaces, and a second position in which an opening is formed between said front edges, drive means for simultaneously moving both doors outwardly in said direction of movement from the first position such that the front edges move outwardly from said line of contact toward a respective one of two opposed sides of the hopper, and halting means for selectively stopping said simultaneous movement when the front edges have moved a predetermined distance from said line of contact to define a required predetermined size of the opening between said front edges, said halting means comprising first and second fixed elongate members each extending in a respective substantially vertical plane generally parallel to said direction of movement of the respective door so as to extend upwardly and outwardly toward a respective one of said opposite sides of the hopper, first and second abutment members, first mounting means for mounting said first abutment member on said first elongate member, second mounting means for mounting said second abutment member on said second elongate member, each of said doors having means thereon for engaging a respective one of said first and second abutment members, each of said first and second elongate members including locating means therealong defining a plurality of separately selectable locations for receiving the respective one of said first and second abutment mounting means, the first abutment mounting means including means for releasably and selectively mounting said first abutment members at a selected one of said locations along said first elongate member and said second abutment mounting means including means for releasably and selectively mounting said second abutment member at a selected one of said locations along said second elongate member whereby to select a predetermined distance movement of the front edges of the doors to select a predetermined size of said opening.

2. A trailer according to claim 1 wherein each of said first and second abutment members comprises a respective surface lying in a plane projecting generally at right angles to said direction of movement of the respective one of said doors and wherein each of said means for engaging on said door includes an abutment engaging means mounted on an edge of the respective one of said doors and spaced from said front edge of the respective one of said doors for engagement with said respective surface.

3. A trailer according to claim 2 wherein each abutment engaging means includes an abutment edge which has a width which is comparatively narrow relative to a width of said surface in a direction projecting outwardly from the side of the hopper.

4. A trailer according to claim 1 wherein each of said abutment mounting means includes a pin and wherein each of said abutment members includes an opening therein for receiving the pin and each of said locating means along said elongate members comprises a plurality of openings therein each for receiving the pin such that the pin can locate the respective abutment member at a selected one of said openings in the respective elongate member.

5. A trailer according to claim 4 wherein each of said first and second elongate members comprises a respective flange lying in a vertical plane with said openings extending horizontally therealong.

6. A trailer according to claim 5 wherein said hopper includes a first and second hopper side wall arranged on opposite sides of said opening and each of said side walls extends downwardly and inwardly toward the opening, the first side wall including first upper and lower horizontal frame members at spaced positions therealong and the second side wall including second upper and lower horizontal frame members at spaced positions therealong and wherein each of said flanges is attached to the respective hopper side wall along a side edge of the flange and wherein a top end of each flange is attached to a respective one of said upper horizontal frame members and a bottom end of each flange is attached to a respective one of said lower horizontal frame members.

7. A trailer according to claim 6 wherein each flange is inclined so that it extends outwardly and upwardly from the respective lower horizontal member to the respective upper horizontal member.

8. A trailer according to claim 5 wherein each abutment member includes a slot defined therein forming first and second portions on opposite sides of the slot such that said first and second portions of the abutment member straddle the respective flange with the respective flange lying in the slot, said opening in the abutment member extending through the portions for receiving the pin passing through the portions and through the respective flange.

* * * * *